United States Patent Office 2,787,623
Patented Apr. 2, 1957

2,787,623

REDUCTION OF 16-IODOPREGNANE COMPOUNDS

William H. Gebert, Morris Plains, N. J.

No Drawing. Application September 30, 1954,
Serial No. 459,550

20 Claims. (Cl. 260—397.4)

This invention relates to a new and improved process for the manufacture of 17α-hydroxy-20-keto steroids which may be variously otherwise substituted in the nucleus, and which themselves possess hormone activity or can be converted in known manner into cortical hormones and their esters, including Reichstein's Substance S, cortisone, hydrocortisone, and their esters.

The present invention embodies my discovery of a method whereby it is possible to transform 16-iodo-17α-hydroxy-20-keto steroids into 17α-hydroxy-20-keto steroids in almost quantitative yields by a simple and inexpensive procedure.

According to the present invention, 17α-hydroxy-20-keto steroids are obtained by deiodinating the corresponding 16-iodo-17α-hydroxy-20-keto steroids with the aid of partially deactivated Raney nickel catalyst, as will be explained more fully hereinbelow.

The starting compounds for the deiodination process of the present invention are preferably obtained in accordance with the process described and claimed in the copending application of Eugene P. Oliveto and Hershel L. Herzog, entitled "Steroid Halohydrins and Process for Manufacturing Same," Serial No. 459,551, filed of even date herewith. As described in such application, 16,17-oxido-20-keto steroids are treated with hydrogen iodide in an organic solvent, such as acetic acid, whereby a substantially quantitative yield is obtained of the corresponding halohydrin, e. g., 16-iodo-17α-hydroxy-pregnenolone. These halohydrins are then dehalogenated in excellent yield in accordance with the present invention by treatment with partially de-activated Raney nickel catalyst, to produce the desired 17α-hydroxy-20-keto steroids.

The 16,17-oxido-20-keto steroids (which on iodohydrination yield the starting compounds of the present invention) are themselves obtained by known reactions from 16-dehydro-20-keto pregnanes, allopregnanes, and pregnenes. These reactions, as is known, can be effected on pregnanes and pregnenes having the substituents at various positions of the nucleus characteristic of the cortical hormones, their esters, and their intermediates. Thus, the double bond in the case of the pregnene compounds may be either between the 4,5- or between the 5,6-carbons; while the substituent at the 3-position may be ketonic oxygen, a free hydroxyl group, or a group convertible into hydroxyl with the aid of hydrolysis, such as an acyloxy group, preferably a lower aliphatic acyloxy radical, such as formyloxy, acetoxy, propionoxy, butyroxy, isovaleroxy, caproyloxy and succinyloxy but may also be cycloalkyl alkanoyloxy, like cyclopentylpropionoxy, or also aromatic in character, like benzoyloxy, phenylacetoxy, and p-toluene sulfonyloxy, and the like. The C-ring may be non-substituted or it may have a hydroxy, ester or keto group at the 11- and/or 12-position, the ester group being as just defined but preferably a lower alkanoyloxy radical; while the C21-position may be occupied by a methyl group, or by a hydroxy or acyloxy methyl group, the acyl group being as just defined. I have found that these substituents are not affected during the course of the deiodination.

The starting compounds of the present invention may accordingly be any of the substances falling within the following general formula:

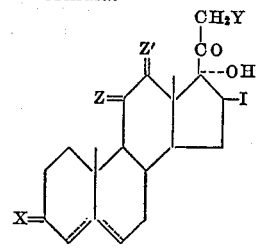

wherein

X is =O, 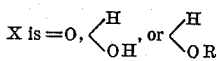

Y is H, OH, or OR
Z is =O; H, OH (α or β); or H, OR (α or β)

Z' is =O, 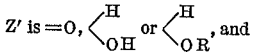 and

R is a lower aliphatic acyl radical, like formyl, acetyl, propionyl, butyryl, isovaleryl, caproyl and succinyl, or cycloaliphatic alkanoyl like cyclopentylpropionyl, or aromatic like benzoyl, phenylacetyl, p-tolu-ene sulfonyl, etc.

The dotted lines in the A and B rings indicate the location of a double bond in the case of the unsaturated compounds.

I have found that by the use of a partially deactivated Raney nickel catalyst, the dehalogenation of the iodohydrin proceeds in the practically total absence of side reactions, so that the yield of the desired 17α-hydroxy steroid is unexpectedly increased to a very considerable degree, being generally over 95%. By combining the procedure of the above-named application with that of the present invention, therefore, the over-all yield in the conversion of 16,17-oxido-20-keto steroids into the corresponding 17α-hydroxy-20-keto steroids can be raised to well over 90%, and in the case of 17α-hydroxypregnenolone, which can readily be converted into Reichstein's Substance S, is over 95%. The reactions involved in the conversion of 16,17-oxido-pregnenolone are typical and are indicated in the following steps:

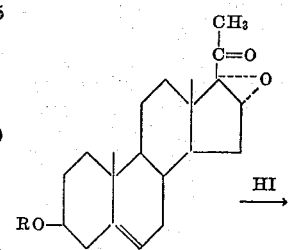

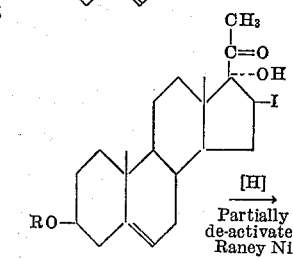
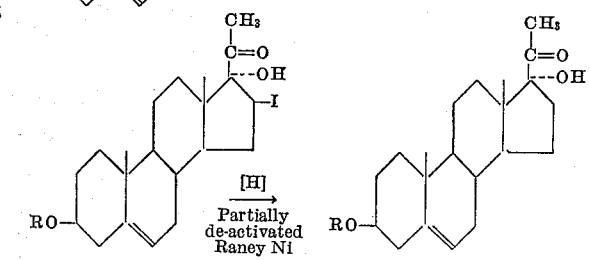

R being as above defined.

The superior yields obtained by the present invention are due not only to the use of steroid iodohydrins in place of the bromohydrin derivatives which have heretofore been employed as intermediates in the conversion of certain 16,17-oxido-20-keto steroids into 17α-hydroxy-20-keto steroids, but also to the use of what I have termed a partially deactivated Raney nickel catalyst. Such partially deactivated Raney nickel catalyst differs from the more or less freshly prepared catalyst in that it is incapable of effecting the reductions for which such catalyst has heretofore been employed, but nevertheless, as I have found, is capable of eliminating iodine from steroid iodohydrins. The partially deactivated catalyst has sufficient adsorbed hydrogen to accomplish this result, but apparently does not have the full amount of hydrogen which it adsorbs in the course of its manufacture. The nature of the deactivation is not fully understood, but may be accomplished in various ways. Thus, storage of the catalyst prepared by any of the known procedures, for long periods of time, of the order of several months or more, preferably six months or longer, operates partially to deactivate the catalyst. Heating the freshly prepared catalyst in dilute alkali will also partially deactivate the same. However, I have obtained best results by partially deactivating the catalyst in situ, that is, in the reaction mixture, by adding an acid, preferably acetic acid, to the reaction mixture. The effect of this partial deactivation is to limit the catalytic reduction to the elimination of iodine, while at the same time eliminating practically completely all side reactions, despite the presence of groups which would normally be reduced by more or less freshly prepared catalyst. The absence of side reactions is all the more surprising as the reduction of the steroid iodohydrins with the partially deactivated catalyst can take place under elevated temperatures, and even under reflux.

I prefer to carry out my deiodination process with the use of acetic acid, preferably under substantially anhydrous conditions. The concentration of the acetic acid is not critical, and may vary from a fraction of 1% to 100%, that is, the acetic acid can constitute the sole solvent for the starting compound. Where the reaction mixture contains acetic acid, freshly prepared Raney nickel catalyst can be employed which is wet with the alcohol, such as methanol, used in its preparation. The solvent medium can be of great variety, and may include one or more of the following: the lower alkanols, various esters in which the acetic acid is soluble, like ethyl acetate; organic acids like propionic, butyric, and other lower alkanoic acids; benzene, toluene, tetrahydrofuran, dioxane, and the like.

The expression "partially deactivated Raney nickel catalyst" as employed in this specification and the claims is, therefore, to be understood as having reference to a Raney nickel catalyst which either prior to the reaction or during the course of the reaction (i. e., by the presence of acetic acid or the like), has been rendered incapable of effecting its normal reducing functions, such as the conversion of a keto group to an alcohol group, but is still sufficiently active to cause the iodine of 16-iodo-17α-hydroxy-20-keto steroids to be split off with replacement by hydrogen contained in the catalyst.

The invention will be described in further detail with the aid of the following examples which are presented by way of illustration only and not as indicating the scope of the invention.

EXAMPLE 1

*17α-hydroxypregnenolone from its 16-iodo derivative*

A solution of 5.0 g. of 16-iodo-17α-hydroxypregnenolone in 200 ml. of ethanol and 2 ml. of glacial acetic acid was refluxed with 10 g. of Raney nickel catalyst for six hours. The catalyst was removed by filtration and the filtrate was concentrated. Dilution with water induced crystallization of the desired 17α-hydroxypregnenolone, which was obtained in a yield of 3.5 g. (96.5% of theory), M. P. 268–273° C.

EXAMPLE 2

*17α-hydroxypregnenolone 3-acetate from its 16-iodo derivative*

A solution of 50 g. of 16-iodo-17α-hydroxypregnenolone 3-acetate in 1 l. of methanol containing 10 ml. of glacial acetic acid, was refluxed with 100 g. of Raney nickel catalyst for 11 hours. The catalyst was removed by filtration and the filtrate was concentrated. Water was added to induce crystallization and there precipitated 36.5 g. of 17α-hydroxypregnenolone 3-acetate, M. P. 229–231° C., amounting to 97.5% of theory.

EXAMPLE 3

*Dehalogenation of iodohydrin in concentrated acetic acid*

A mixture of 75 g. (dry basin) of Raney nickel catalyst (Mozingo) (wet weight ca. 150 g., catalyst wet with methanol), 250 ml. of glacial acetic acid and 25.0 of the iodohydrin of $\Delta^{16}$-pregnenolone was heated at 80–90° C. with good agitation for about 30 minutes. The mixture was filtered hot through a mat of diatomaceous earth and the catalyst cake was washed with hot acetic acid. The filtrate was concentrated to 125 ml. and the product precipitated completely by the addition of 600 ml. of hot water. The cooled mixture was filtered and washed thoroughly with water, affording 18.7 g. of 17α-hydroxypregnenolone 3-acetate, M. P. 228–230°. Sludging with 38 ml. of methanol, followed by filtration and a wash with cold methanol yielded 17.7 g. (95%) of 17α-hydroxypregnenolone 3-acetate, M. P. 234–235°; $[\alpha]_D^{25}$ —40° (1% in dioxane).

While acetic acid is the preferred deactivating agent, it can be replaced in whole or in part by other lower alkanoic acids, like propionic and butyric acids.

In similar manner, by employing the appropriate 16-iodo-17α-hydroxy-20-keto starting compound, there can be obtained 3,17α-dihydroxy-pregnan-20-one, 17α-21-dihydroxy - pregnan - 3,20 - dione, $\Delta^4$ - 17α,21 - dihydroxy - pregnen - 3,20 - dione, 11α,17α - dihydroxypregnan-3,20-dione, $\Delta^4$-11α,17α-dihydroxy-pregnen-3,20-dione, 11β,17α-dihydroxy-pregnan-3,20-dione, $\Delta^4$-11β,17α-dihydroxy-pregnen-3,20-dione, 17α,21-dihydroxy-pregnen-3,11,20-trione, $\Delta^4$ - 17α,21-dihydroxy-pregnen-3,11,20-trione, and the like, and the corresponding allo-pregnanes, and also the 3- and/or 11α- and/or 11β- and/or 21-esters of these compounds where the starting compounds contained such ester groups, the esters being preferably of acetic acid but may also be of other suitable acids, such as those named hereinabove.

I claim:

1. Process for the manufacture of 17a-hydroxy-20-keto steroids, comprising reducing a compound of the group consisting of saturated and unsaturated pregnanes of the formula:

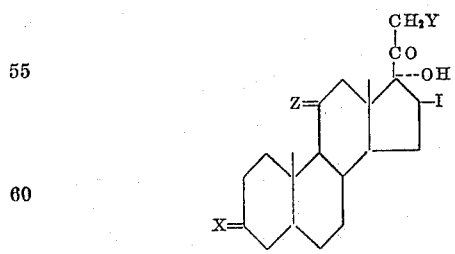

wherein

X is a member of the group consisting of =O, $\left\langle{}^H_{OH}\right.$, and $\left\langle{}^H_{OR}\right.$ Y is a member of the group consisting of H, OH, and OR, and Z is a member of the group consisting of =O, $\left\langle{}^H_{OH}\right.$ and $\left\langle{}^H_{OR}\right.$ R standing for the acyl radical of a lower alkanoic acid, the double bond of the unsaturated compounds being attached to $C_5$, with a partially deactivated Raney nickel catalyst 2. Process for the manufacture of 17a-hydroxy-20-keto steroids, comprising reducing a compound of the group consisting of saturated and unsaturated pregnanes of the formula:

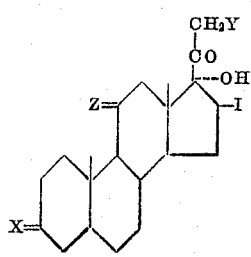

wherein

X is a member of the group consisting of =O, $\diagup_{OH}^{H}$, and $\diagup_{OR}^{H}$ Y is a member of the group consisting of H, OH, and OR, and Z is a member of the group consisting of =O, $\diagup_{OH}^{H}$ and $\diagup_{OR}^{H}$ R standing for the acyl radical of a lower alkanoic acid, the double bond of the unsaturated compounds being attached to $C_5$, with Raney nickel catalyst in a substantially anhydrous solvent medium containing acetic acid 3. Process according to claim 2, wherein the solvent is composed of glacial acetic acid.

4. Process according to claim 2, wherein the solvent is a mixture of a lower alkanol and glacial acetic acid.

5. Process according to claim 4, wherein the reaction is conducted at a temperature of about 80 to 90° C.

6. Process according to claim 2, wherein the solvent comprises a major proportion of glacial acetic acid, and wherein the reaction is conducted under reflux.

7. Process for the manufacture of 17α-hydroxypregnenolone which comprises reducing 16-iodo-17α-hydroxypregnenolone in solution with a partially deactivated Raney nickel catalyst.

8. Process for the manufacture of 17α-hydroxypregnenolone which comprises reducing 16-iodo-17α-hydroxypregnenolone in a solution containing acetic acid with a Raney nickel catalyst.

9. Process for the manufacture of 17α-hydroxypregnenolone which comprises reducing 16-iodo-17α-hydroxypregnenolone dissolved in glacial acetic acid with a Raney nickel catalyst.

10. Process for the manufacture of 17α-hydroxypregnenolone acetate which comprises reducing 16-iodo-17α-hydroxypregnenolone acetate in a solution containing acetic acid with a Raney nickel catalyst.

11. Process for the manufacture of 17α-hydroxypregnenolone acetate which comprises reducing 16-iodo-17α-hydroxypregnenolone acetate dissolved in glacial acetic acid with a Raney nickel catalyst.

12. Process for the manufacture of 17α-hydroxypregnanolone acetate which comprises reducing 16-iodo-17α-hydroxypregnanolone acetate in solution with a partially deactivated Raney nickel catalyst.

13. Process for the manufacture of 17α-hydroxypregnanolone acetate which comprises reducing 16-iodo-17α-hydroxypregnanolone acetate in a solution containing acetic acid with a Raney nickel catalyst.

14. Process for the manufacture of 17α,21-dihydroxy-$\Delta^4$-pregnen-3,20-dione 21-acetate, which comprises reducing 16-iodo-17α,21-dihydroxy-$\Delta^4$-pregnen-3,20-dione 21-acetate in solution with a partially deactivated Raney nickel catalyst.

15. Process for the manufacture of 17α,21-dihydroxy-$\Delta^4$-pregnen-3,20-dione 21-acetate which comprises reducing 16-iodo-17α,21-dihydroxy-$\Delta^4$-pregnen-3,20-dione 21-acetate in a solution containing acetic acid with a Raney nickel catalyst.

16. Process for the manufacture of 17α,21-dihydroxypregnan-3,11,20-trione 21-acetate which comprises reducing 16-iodo-17α,21-dihydroxypregnan-3,11,20-trione 21-acetate in solution with a partially deactivated Raney nickel catalyst.

17. Process for the manufacture of 17α,21-dihydroxypregnan-3,11,20-trione 21-acetate, which comprises reducing 16-iodo-17α,21-dihydroxypregnan-3,11,20-trione 21-acetate in a solution containing acetic acid with a Raney nickel catalyst.

18. Process for the manufacture of 11β,17α-dihydroxypregnan-3,20-dione which comprises reducing 17-iodo-11β,17α-dihydroxypregnan-3,20-dione in solution with a partially deactivated Raney nickel catalyst.

19. Process for the conversion of a compound of the group consisting of 16,17-oxido-20-keto pregnanes and pregnenes into the corresponding 17α,20-keto pregnane or pregnene which comprises reacting such compound with hydriodic acid until the oxide ring is opened up and the corresponding 16-iodo-17α-hydroxy-keto compound is produced, and then reducing such 16-iodo compound with partially deactivated Raney nickel catalyst to effect elimination of the iodine atom.

20. Process for the conversion of 16,17-oxido-pregnenolone into 17α-pregnenolone, which comprises reacting 16,17-oxido-pregnolone with hydriodic acid until the oxide ring is opened up and 16-iodo-17α-hydroxypregnenolone is produced, and then reducing the 16-iodo compound in an anhydrous solution thereof containing acetic acid and in the presence of a Raney nickel catalyst.

References Cited in the file of this patent

UNITED STATES PATENTS 2,602,804    Kendall _____ July 8, 1952

OTHER REFERENCES

Julian: Journal Am. Chem. Soc. 72, pages 5145–5147 (1950).

Julian: Recent Advances in Hormone Research, vol. VI, pages 204–205 (1951).